(12) United States Patent
Takahashi et al.

(10) Patent No.: US 11,850,952 B2
(45) Date of Patent: Dec. 26, 2023

(54) SYSTEM FOR POWER FEEDING DURING TRAVELING

(71) Applicant: DENSO CORPORATION, Kariya (JP)

(72) Inventors: Eisuke Takahashi, Kariya (JP); Hayato Sumiya, Kariya (JP); Takuya Kiguchi, Kariya (JP); Nobuhisa Yamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 177 days.

(21) Appl. No.: 17/476,073

(22) Filed: Sep. 15, 2021

(65) Prior Publication Data

US 2022/0001753 A1 Jan. 6, 2022

Related U.S. Application Data

(63) Continuation of application No. PCT/JP2020/004717, filed on Feb. 7, 2020.

(30) Foreign Application Priority Data

Mar. 15, 2019 (JP) ................................ 2019-048201

(51) Int. Cl.
   *B60L 50/16* (2019.01)
   *H02J 50/12* (2016.01)
   *B60L 53/12* (2019.01)

(52) U.S. Cl.
   CPC ............... *B60L 50/16* (2019.02); *B60L 53/12* (2019.02); *H02J 50/12* (2016.02)

(58) Field of Classification Search
   None
   See application file for complete search history.

(56) References Cited

U.S. PATENT DOCUMENTS

| 2015/0077045 | A1* | 3/2015 | Harris | ................... B60L 50/51 320/108 |
| 2016/0229294 | A1 | 8/2016 | Abe et al. | |
| 2019/0006094 | A1* | 1/2019 | Furiya | ................... H01F 27/24 |
| 2022/0118878 | A1* | 4/2022 | Kwapisz | ................ B60L 53/66 |

FOREIGN PATENT DOCUMENTS

| JP | 2012-134374 A | 7/2012 |
| JP | 2014-103735 A | 6/2014 |

OTHER PUBLICATIONS

Mar. 10, 2020 International Search Report for International Application No. PCT/JP2020/004717.

\* cited by examiner

*Primary Examiner* — Daniel Kessie
(74) *Attorney, Agent, or Firm* — Oliff PLC

(57) ABSTRACT

A system for power feeding during traveling includes a coil for power transmission, a power supply unit which supplies power to the coils, at least one shielding member which shields an electromagnetic field of the coil, and a hole provided to the shielding members.

4 Claims, 6 Drawing Sheets

SYSTEM FOR POWER FEEDING DURING TRAVELING

CROSS-REFERENCE TO RELATED APPLICATION

The present application is based on and claims the benefit of priority from earlier Japanese Patent Application No. 2019-048201 filed on Mar. 15, 2019, the description of which is incorporated herein by reference.

BACKGROUND

Technical Field

The present disclosure relates to a system for power feeding which supplies power during traveling to a mobile object such as a traveling vehicle.

Related Art

A contactless power feeding device which supplies power to a vehicle which is traveling is disclosed. This contactless power feeding device, which includes a primary side shielding member and a secondary side shielding member around a coil for power transmission, reduces external leakage of an electromagnetic field.

SUMMARY

An aspect of the present disclosure provides a system for power feeding during traveling. The system includes: a coil for power transmission; a power transmission circuit which supplies power to the coil; at least one shielding member which shields an electromagnetic field of the coil; and a hole provided to the shielding member.

DETAILED DESCRIPTION OF THE PREFERRED EMBODIMENTS

JP 2014-103735 A discloses a contactless power feeding device which supplies power to a vehicle which is traveling. This contactless power feeding device, which includes a primary side shielding member and a secondary side shielding member around a coil for power transmission, reduces external leakage of an electromagnetic field.

Providing a shielding member leads to reduction in leakage of an electromagnetic field. However, a problem occurs that eddy current is generated at the shielding member, which increases loss. Thus, a technique is desired which can achieve both reduction in external leakage of an electromagnetic field and reduction in loss due to eddy current. This problem also occurs in a case where power is fed to other mobile objects such as a motorcycle, during traveling.

First Embodiment

Figure 1:
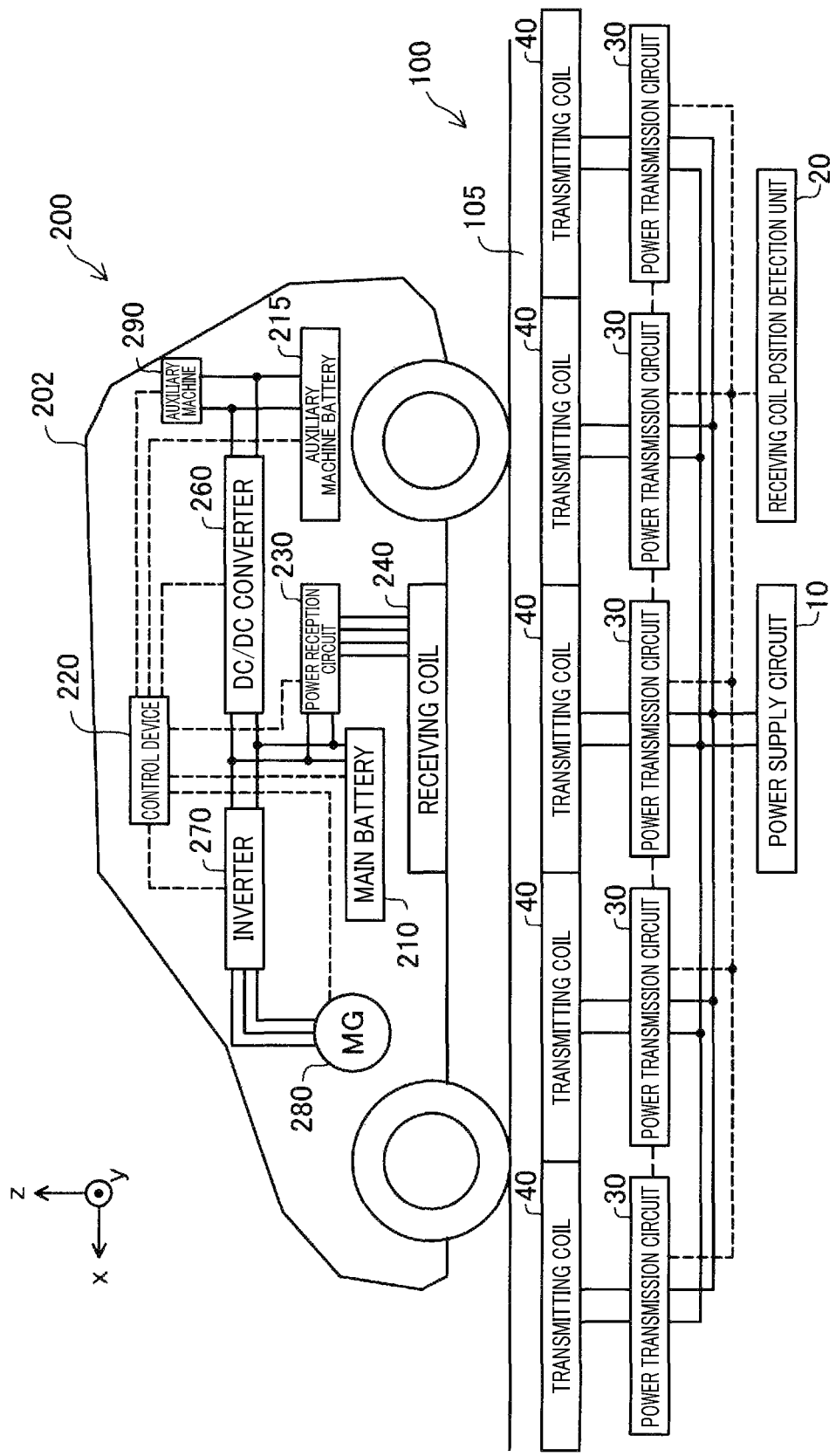
FIG. 1 is a block diagram of a system for power feeding during traveling.

As illustrated in FIG. 1, a contactless power feeding system for power feeding during traveling includes a system 100 for power feeding during traveling provided on a road 105 side, and a power receiving system during traveling 200 on a vehicle 202 side. The contactless power feeding system is a system which can feed power to the vehicle 202 from the system 100 for power feeding during traveling while the vehicle 202 is traveling. The vehicle 202 is constituted, for example, as an electric car or a hybrid car. In FIG. 1, an x-axis direction indicates a traveling direction of the vehicle 202, a y-axis direction indicates a width direction of the vehicle 202, and a z-axis direction indicates a vertical direction. The x-axis, y-axis and z-axis directions in other drawings which will be described later indicate the same directions as the directions in FIG. 1.

The system 100 for power feeding during traveling provided on the road 105 side includes a plurality of coils 40 for power transmission (hereinafter, also referred to as "transmitting coils 40"), a plurality of power transmission circuits 30 which respectively supply AC currents to the plurality of transmitting coils 40, a power supply circuit 10 which supplies DC voltages to the plurality of power transmission circuits 30, and a receiving coil position detection unit 20.

The plurality of transmitting coils 40 are provided along a traveling direction on the road 105. The power transmission circuit 30 is a circuit which converts the DC voltage supplied from the power supply circuit 10 into a high-frequency AC voltage and applies the AC voltage to the transmitting coil 40, and includes an inverter circuit, a filter circuit, and a resonant circuit. In the present embodiment, description of the inverter circuit, the filter circuit and the resonant circuit will be omitted. The power supply circuit 10 is a circuit which supplies a DC voltage to the power transmission circuit 30. For example, the power supply circuit 10 is constituted as an AC/DC converter circuit which rectifies an AC voltage supplied from a commercial power supply and outputs a DC voltage. The DC voltage output by the power supply circuit 10 does not have to be a complete DC voltage and may include a certain degree of fluctuation (ripple).

The receiving coil position detection unit 20 detects a position of a coil 240 for power reception (hereinafter, also referred to as a "receiving coil 240") mounted to the vehicle 202. The receiving coil position detection unit 20 may, for example, detect the position of the receiving coil 240 from a level of transmission power or transmission currents at the plurality of power transmission circuits 30 or may detect the position of the receiving coil 240 by utilizing wireless communication with the vehicle 202 or a position sensor which detects a position of the vehicle 202. The plurality of power transmission circuits 30 execute power transmission by using one or more transmitting coils 40 close to the receiving coil 240 in accordance with the position of the receiving coil 240 detected at the receiving coil position detection unit 20.

The vehicle 202 includes a main battery 210, an auxiliary machine battery 215, a control device 220, a power reception circuit 230, the receiving coil 240, a DC/DC converter circuit 260, an inverter circuit 270, a motor generator 280, and an auxiliary machine 290. The receiving coil 240 is connected to the power reception circuit 230, and the main battery 210, a high-voltage side of the DC/DC converter circuit 260, and the inverter circuit 270 are connected to output of the power reception circuit 230. The auxiliary machine battery 215 and the auxiliary machine 290 are connected to a low-voltage side of the DC/DC converter circuit 260. The motor generator 280 is connected to the inverter circuit 270.

The receiving coil 240 is a device which generates induced electromotive force by electromagnetic induction between the receiving coil 240 and the transmitting coil 40. The power reception circuit 230 includes a rectifier circuit which converts the AC voltage output from the receiving coil 240 into a DC voltage. Note that the power reception circuit 230 may include a DC/DC converter circuit which converts the DC voltage generated at the rectifier circuit into a voltage appropriate for charging of the main battery 210. The DC voltage output from the power reception circuit 230 can be utilized to charge the main battery 210 and drive the motor generator 280 via the inverter circuit 270, and also can be utilized to charge the auxiliary machine battery 215 and drive the auxiliary machine 290 by being stepped down using the DC/DC converter circuit 260.

The main battery 210 is a secondary battery which outputs a relatively high DC voltage for driving the motor generator 280. The motor generator 280 operates as a three-phase AC motor and generates drive force to be used by the vehicle 202 to travel. The motor generator 280 operates as a generator upon deceleration of the vehicle 202 and generates a three-phase AC voltage. In a case where the motor generator 280 operates as a motor, the inverter circuit 270 converts the DC voltage of the main battery 210 into a three-phase AC voltage and supplies the three-phase AC voltage to the motor generator 280. In a case where the motor generator 280 operates as a generator, the inverter circuit 270 converts the three-phase AC voltage output by the motor generator 280 into a DC voltage and supplies the DC voltage to the main battery 210.

The DC/DC converter circuit 260 converts the DC voltage of the main battery 210 into a lower DC voltage and supplies the DC voltage to the auxiliary machine battery 215 and the auxiliary machine 290. The auxiliary machine battery 215 is a secondary battery which outputs a relatively low DC voltage for driving the auxiliary machine 290. The auxiliary machine 290 includes peripheral devices such as an air conditioning device, an electronic power steering device, headlights, a directional signal indicator and wipers of the vehicle 202, and various accessories of the vehicle 202.

The control device 290 controls components in the vehicle 202. The control device 220 controls the power reception circuit 230 to receive power when power is fed in a contactless manner during traveling.

Figure 2:
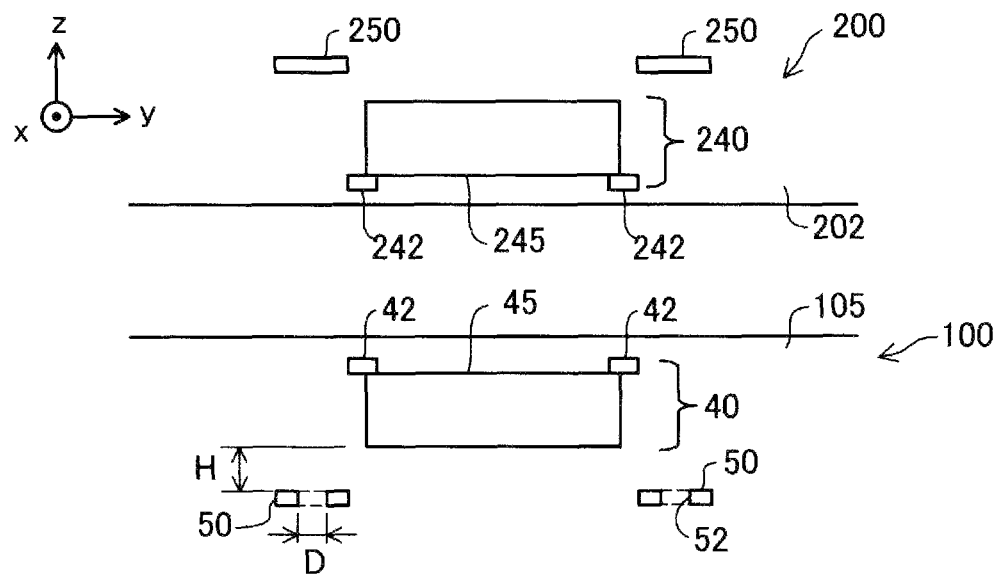
FIG. 2 is an explanatory diagram illustrating configurations of a coil and a shielding member of a contactless power feeding system during traveling.
Figure 3:
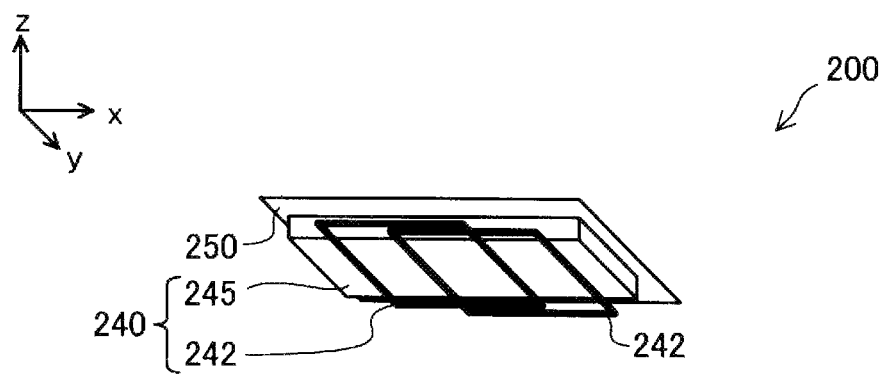
FIG. 3 is an explanatory diagram illustrating configurations of a receiving coil and a shielding member of the system for power feeding during traveling.

As illustrated in FIG. 2 and FIG. 3, the power receiving system during traveling 200 on the vehicle 202 side includes two windings 242, a core 245 and a shielding member 250 as components near the receiving coil 240. The receiving coil 240 includes the winding 242 and the core 245.

The core 245 is, for example, formed with a soft magnetic material in an approximately cubic shape and is disposed at substantially the center in a width direction of the vehicle 202. As the soft magnetic material, for example, ferrite, a power magnetic core, a dust core, and an iron soft magnetic material are used. Examples of the iron soft magnetic material include, for example, an electromagnetic steel sheet (silicon steel sheet), permalloy, an amorphous metal material, and a nanocrystal soft magnetic material.

The windings 242 are disposed below the core 245, that is, on the road 105 side so that the core 245 can be seen in loops of the windings 242 when the receiving coil 240 is viewed from the road 105 side. While in the example illustrated in FIG. 3, the vehicle 202 includes two windings 242 which partially overlap with each other, the two windings 242 may be disposed so as not to overlap with each other. Further, it is also possible to employ a configuration where only one winding 242 is provided. Still further, it is also possible to employ a configuration where a plurality of cores 245 and a plurality of windings 242 are provided.

The shielding member 250 is disposed so as to enclose the core 245 on an opposite side of the road 105 of the core 245. The receiving coil 240 is preferably positioned on an inner side of the shielding member 250 when viewed from the road 105, because it is possible to further improve a shielding effect. The shielding member 250 is formed with a material having relative magnetic permeability in a frequency band used, which is less than 1. Specifically, the shielding member 250 is formed with a conductive non-magnetic material such as aluminum and copper or a conductive ferromagnetic material such as iron.

Figure 4:
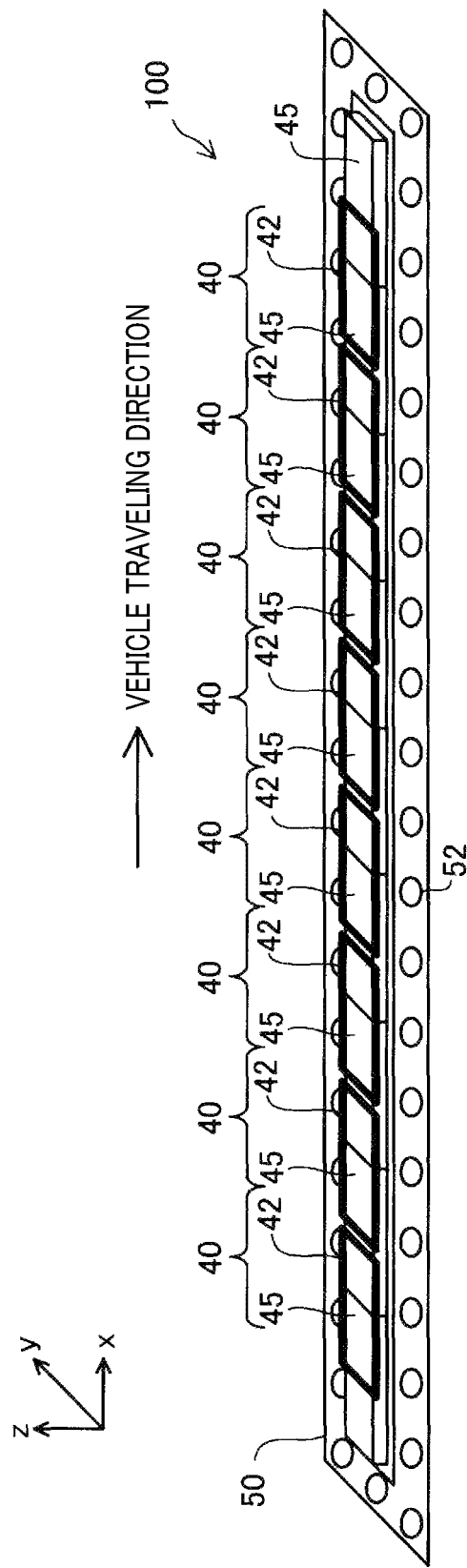
FIG. 4 is an explanatory diagram illustrating configurations of transmitting coils and a shielding member of the system for power feeding power during traveling.

As illustrated in FIG. 2 and FIG. 4, the system 100 for power feeding during traveling provided on the road 105 side includes windings 42, cores 45 and a shielding member 50 as components near the transmitting coils 40. The transmitting coil 40 includes the winding 42 and the core 45. The core 45 is formed, for example, with a soft magnetic material in an approximately cubic shape. A plurality of cores 45 are embedded in the road 105 and disposed at substantially the center of a lane of the road 105 so that the plurality of cores 45 are arranged along a traveling direction (x direction) of the vehicle 202. In the example illustrated in FIG. 4, n cores 45 are tightly arranged as one line.

The windings 42 are disposed on a surface side of the road 105 of the cores 45. The windings 42 are disposed above the cores 45, that is, on the road 105 side so that the cores 45 can be seen in loops of the windings 242 when the transmitting coils 40 are viewed from the surface side of the road 105. A size of the winding 42 in a width direction (y direction) of the road 105 is substantially equal to or slightly greater than a size of the core 45 in the width direction (y direction) of the road 105. While in the example illustrated in FIG. 4, the winding 242 is disposed across the two adjacent cores 45, the winding 242 may be disposed so as not to be across two adjacent cores 45.

The shielding member 50 is disposed so as to enclose n cores 45 on an opposite side of the surface of the road 105 of the cores 45. While in the present embodiment, n cores 45 are tightly arranged as one line, the cores 45 may be provided while intervals are provided between adjacent two cores 45. In this case, the shielding member 50 may either enclose n cores 45 or enclose each core 45.

The shielding member 50 is disposed so as to enclose n cores 45 on an opposite side of the cores 45 to the facing the road 105. Note that the transmitting coils 40 are preferably disposed on an inner side of the shielding member 50 when viewed from the surface side of the road 105, because it is possible to further improve a shielding effect. The shielding member 50 is formed with a material having relative magnetic permeability in a frequency band used, which is less than 1 in a similar manner to the shielding member 250. The shielding member 50 includes a plurality of circular holes 52. Here, an interval between the transmitting coil 40 and the shielding member 50 is set as H, and a diameter of the hole 52 is set as D.

Figure 5:
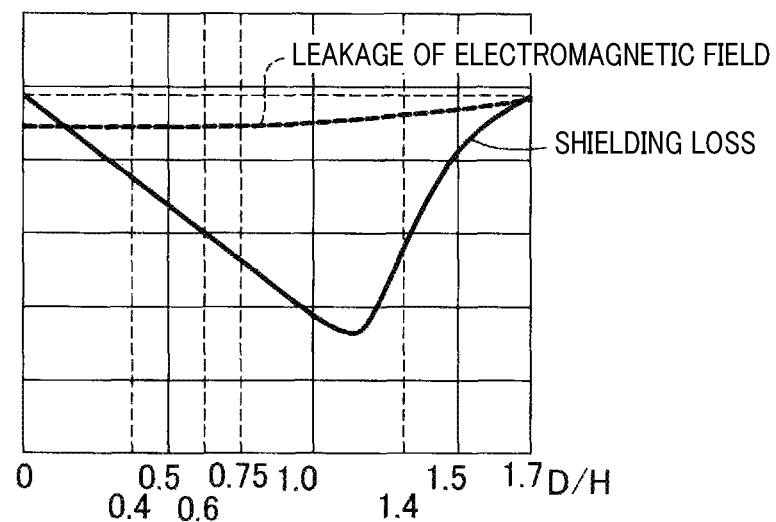
FIG. 5 is a graph indicating relationships among a ratio of (equivalent circle diameter of a hole of the shielding member)/(interval between the transmitting coil and the shielding member), leak current and loss.

As illustrated in FIG. 5, shielding loss decreases in a case where D/H becomes greater from 0, becomes extremely small in a case where D/H becomes substantially 1, and becomes greater in a case where D/H exceeds 1. From the graph shown in FIG. 5, the shielding loss is smaller than shielding loss in a case where the holes 52 are not provided, if D/H is less than approximately 1.7, that is, the diameter D of the hole 52 is less than 1.7 times of the interval H between the transmitting coil 40 and the shielding member 50 to (in) which the holes 52 are provided. D/H is preferably equal to or less than 1.5, and, more preferably, equal to or less than 1.35. Further, a lower limit of D/H is preferably equal to or greater than 0.4 and, more preferably, equal to or greater than 0.6. This can reduce eddy current of an eddy which is smaller than the hole 52. Typically, if eddy current is generated, Joule heat is generated, which causes loss. In the present embodiment, loss due to eddy current can be reduced by reducing current of an eddy which is smaller than the hole 52.

As illustrated in FIG. 5, in a case where D/H (diameter of the hole 52/interval between the transmitting coil 40 and the shielding member 50) is indicated on a horizontal axis, leak current gradually increases in a case where D/H becomes greater from 0. However, the leak current does not increase so much in a range in which loss due to eddy current can be reduced as described above. Thus, in the range in which loss due to eddy current can be reduced, it is possible to achieve both reduction in leak current and reduction in loss due to eddy current. Note that an equivalent circle diameter of the hole 52 is preferably equal to or less than half of an equivalent circle diameter of the transmitting coil 40. The equivalent circle diameter means a diameter of a perfect circle corresponding to an area of a figure. It is because a smaller equivalent circle diameter of the hole 52 can reduce leak current.

According to the first embodiment described above, the system 100 for power feeding during traveling includes the shielding member 50 which shields an electromagnetic field of the transmitting coils 40, and the shielding member 50 has holes 52, so that it is possible to reduce leak current by using the shielding member 50 and reduce losses due to eddy current by reducing eddy current of an eddy smaller than the holes 52. Further, eddy current of a small eddy contributes less to reduction in external leakage of an electromagnetic field. Thus, even if generation of eddy current of a small eddy is prevented, influence on an effect of reducing leakage of the electromagnetic field can be reduced.

An upper limit of D/H is only required to be less than approximately 1.7, preferably equal to or less than 1.5, and more preferably, equal to or less than 1.35. Meanwhile, a lower limit of D/H is preferably equal to or greater than 0.4, more preferably, equal to or greater than 0.6, and further more preferably, equal to or greater than 0.75.

Second Embodiment

Figure 6:
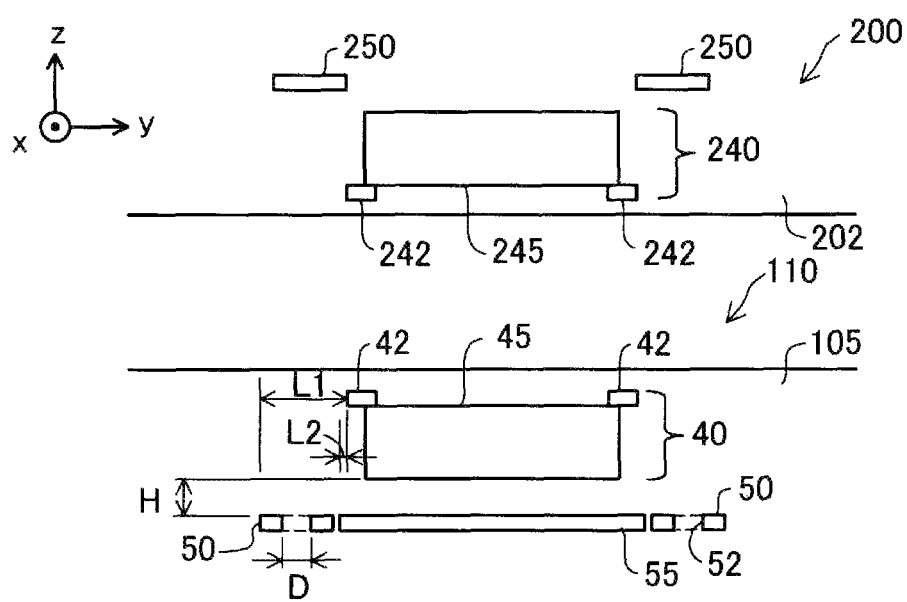
FIG. 6 is an explanatory diagram illustrating configurations of a coil and a shielding member of a system for power feeding during traveling in a second embodiment.

As illustrated in FIG. 6, the system 100 for power feeding during traveling 110 provided on the road 105 side in the second embodiment is different from the system 100 for power feeding during traveling in the first embodiment in that a sub-shielding member 55 is provided inside the shielding member 50. The sub-shielding member 55 is formed with a non-magnetic metal such as aluminum or copper. In this case, in a case where an interval between the transmitting coil 40 and the shielding member 50 in the horizontal direction (y direction) is set as L1, and an interval between the transmitting coil 40 and the sub-shielding member 55 in the horizontal direction (y direction) is set as L2, L1>L2. In this case, the holes 52 are formed in the shielding member 50 for which an interval to the transmitting coil 40 in the horizontal direction is greater. This can reduce loss due to eddy current while reducing leak current even if the receiving coil 240 of the vehicle 202 is misaligned relative to the transmitting coils 40 of the system 100 for power feeding during traveling.

While in the first and the second embodiments described above, the holes 52 are provided to (in) the shielding member 50 of the systems 100, 110 for power feeding during traveling, holes may be provided to (in) the shielding member 250 of the system 200 for power feeding during traveling provided on the vehicle 202 side. Further, in the second embodiment, holes may be further provided to (in) the sub-shielding member 55.

While in the first and the second embodiments described above, the hole 52 has a substantially circular shape, the hole 52 may have a rectangular shape or another polygonal shape. In this case, a diameter D of a circle which has the same area as an area S of the rectangular shape or another polygonal shape in a case where the shape of the hole 52 is regarded as a circle may be used as a value of D. In this case, $S=\pi \times D^2/4$.

Third Embodiment

Figure 7:
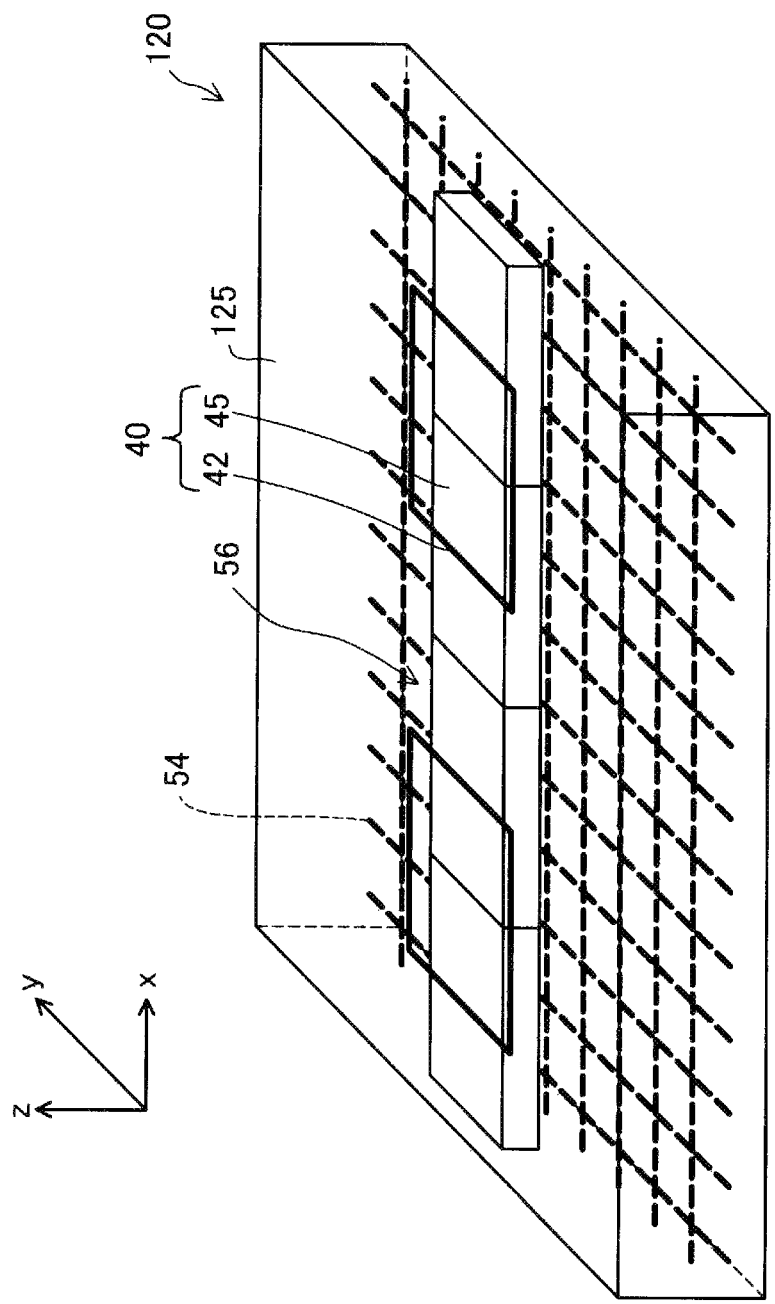
FIG. 7 is an explanatory diagram illustrating a system for power feeding during traveling (laying unit) in a third embodiment.
Figure 8:
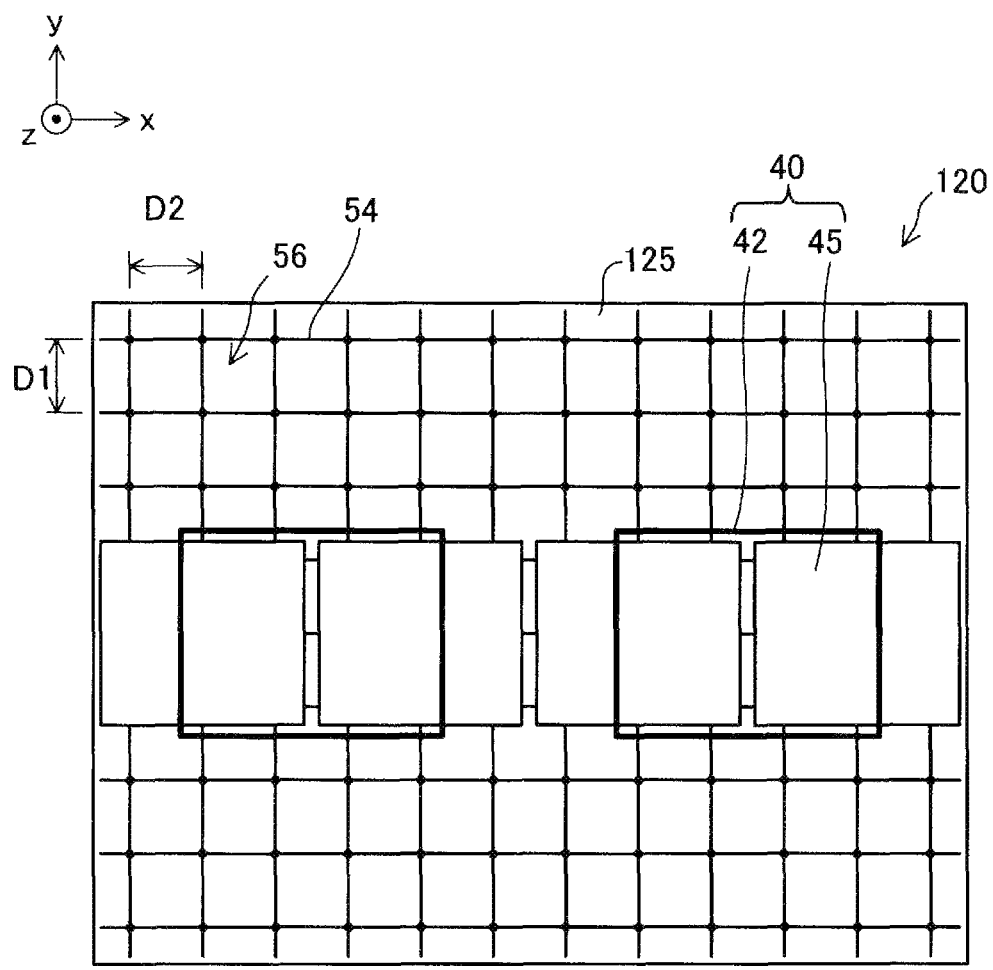
FIG. 8 is an explanatory diagram illustrating the system for power feeding during traveling (laying unit) in the third embodiment.
Figure 9:
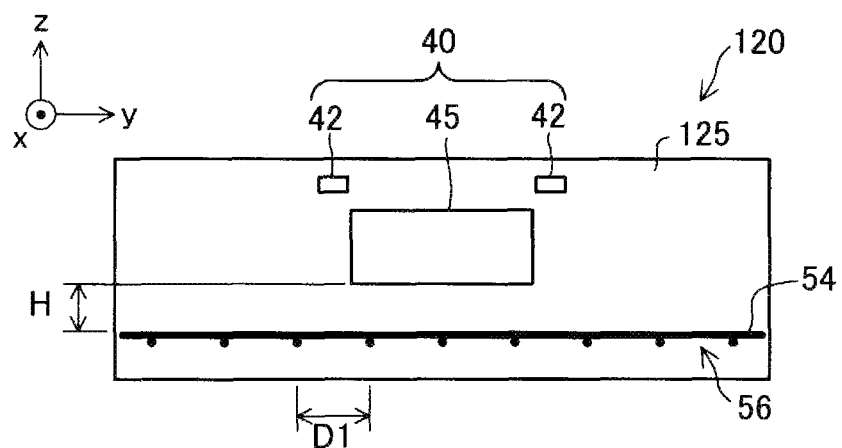
FIG. 9 is an explanatory diagram illustrating the system for power feeding during traveling (laying unit) in the third embodiment.

As illustrated in FIG. 7 to FIG. 9, a system 120 for power feeding during traveling in the third embodiment is formed as a laying unit in which the transmitting coils 40 and wire mesh bars 54 are integrally formed by using concrete 125. The transmitting coil 40 includes a winding 42 and a core 45. The wire mesh bars 54 are formed by metal bars being arranged in a grid pattern and the intersecting points being welded. The wire mesh bars 54 have a function of reinforcing concrete and a function as a shielding member. Further, the wire mesh bars 54 have openings 56 enclosed with four metal bars. The openings 56 function as holes of the shielding member and reduce eddy current. The openings 56 will be also referred to as "holes 56".

As illustrated in FIG. 8, intervals between the metal bars are set as D1 and D2, and an interval between the transmitting coil 40 and the wire mesh bar 54 is set as H. The equivalent circle diameter D, and D1 and D2 have a relationship of $D1 \times D2 = \pi \times D^2/4$. Thus, a value calculated through $D=(4 \times D1 \times D2/\pi)^{1/2}$ can be used as the value of D. As described in the first embodiment, the upper limit of D/H is only required to be less than approximately 1.7, preferably, equal to or less than 1.5, and more preferably, equal to or less than 1.35. Meanwhile, the lower limit of D/H is preferably equal to or greater than 0.4, more preferably, equal to or greater than 0.6, and further more preferably, equal to or greater than 0.75.

It is not necessary to cast concrete 125 on site if the system 120 for power feeding during traveling is formed in advance at a factory as a laying unit, so that it is possible to omit a period for curing the concrete 125 on site. As a result, a vehicle or the like can travel immediately after the system 120 for power feeding during traveling is laid. Further, the concrete 125 is solidified at the factory, which can prevent quality of the concrete 125 from being influenced by weather or the like.

While in the above-described third embodiment, the metal bars are arranged in a grid pattern, openings having a triangular shape, a rectangular shape, a hexagonal shape or another shape may be formed.

In the above-described embodiments, description has been provided assuming that the contactless power feeding system for power feeding during traveling is a system which can feed power from the system 100 for power feeding during traveling to the vehicle 202 while the vehicle 202 is traveling. It is also possible to employ a configuration where in a case where the vehicle 202 can regenerate electric energy from traveling energy by deceleration or the like, and in a case where the main battery 210 of the vehicle 202 is fully charged, power can be transmitted from the power receiving system 200 during traveling of the vehicle 202 to the system 100 for power feeding during traveling provided on the road 105 side.

While in the above-described respective embodiments, the equivalent circle diameter of the hole 52 is used as the value of D, for example, in a case where the hole 52 has a rectangular shape having two sides D1 and D2, $(D1 \times D2)^{1/2}$ may be used as the value of D.

The present disclosure is not limited to the above-described embodiments and can be implemented with various configurations within a range not deviating from the gist of the present disclosure. For example, technical features in the embodiments can be replaced or combined as appropriate to solve part or all of the above-described problems or to achieve part or all of the above-described effects. Further, the technical features which are not described as essential features in the present specification can be deleted as appropriate.

According to an aspect of the present disclosure, a system (100, 110, 120) for power feeding during traveling is provided. The system for power feeding includes a coil (40) for power transmission, a power transmission circuit (30) which supplies power to the coil, at least one shielding member (50, 54) which shields an electromagnetic field of the coil, and a hole (52, 56) provided to (in) the shielding member.

According to the aspect, leakage of the electromagnetic field can be reduced by the shielding member, and loss due to eddy current can be reduced by providing a hole to the shielding member to prevent generation of eddy current of an eddy smaller than a size of the hole. Further, small eddy current contributes less to reduction in external leakage of an electromagnetic field. Thus, even if generation of eddy current of a small eddy is prevented, an effect of reducing leakage of the electromagnetic field is less negatively affected.

What is claimed is:

1. A system for power feeding during traveling, comprising:
    a coil for power transmission;
    a power transmission circuit which supplies power to the coil;
    at least one shielding member which shields an electromagnetic field of the coil; and
    a hole provided to the shielding member, wherein
    an equivalent circle diameter of the hole is equal to or less than 1.5 times of an interval between the coil and the shielding member to which the hole is provided, and
    the equivalent circle diameter of the hole is equal to or greater than 0.4 times of the interval between the coil and the shielding member to which the hole is provided.

2. The system for power feeding during traveling according to claim 1, wherein
    the at least one shielding member includes two shielding members, and
    the hole is provided to the shielding member for which the interval to the coil is greater.

3. The system for power feeding during traveling according to claim 1, wherein
    the equivalent circle diameter of the hole is equal to or less than half of an equivalent circle diameter of the coil.

4. The system for power feeding during traveling according to claim 1, wherein
    the system is formed as a laying unit which is to be laid on a road and which is formed with concrete,
    the hole is formed with wire mesh bars which reinforce the concrete, and
    the wire mesh bars also function as the at least one shielding member.

\* \* \* \* \*